United States Patent Office 3,502,615
Patented Mar. 24, 1970

3,502,615
SYNERGISTIC ANTIOZONANT MIXTURE AND USE THEREOF IN RUBBER
Robert H. Rosenwald, Western Springs, Ill., assignor to Universal Oil Products Company, Des Plaines, Ill., a corporation of Delaware
No Drawing. Filed Jan. 25, 1967, Ser. No. 611,587
Int. Cl. C08c 11/46; C09k 3/00; B01j 1/16
U.S. Cl. 260—45.9                    10 Claims

ABSTRACT OF THE DISCLOSURE

Synergistic mixture of phenylenediamine antiozonant and N,N'-bis-(phenylalkyl)-p-phenylenediamine, and use thereof in rubber.

BACKGROUND OF THE INVENTION

Certain phenylenediamine derivatives have been found to be very active antiozonants in rubber. However, there always is a need for more active antiozonants. The improved antiozonants offer important economical advantages in the art of stabilizing rubber against cracking due to ozone. The more active antiozonants, when used in conventional concentrations, afford greater stabilization to the rubber or they permit the use of lower concentrations to obtain equal antiozonation.

Because of the desire to discover improved antiozonants, the phenylenediamine derivatives have been the subject of extensive research. It appears that various phenylenediamine derivatives behave differently and accordingly it is difficult to predict in advance whether a particular derivative will be an effective antiozonant. For example, the prior art teaches that N-phenylethyl-N'-phenyl-p-phenylenediamine is an effective antiozonant in rubber. It will be noted that this compound is unsymmetrical in that one of the nitrogens contains a phenylethyl substituent and the other contains a phenyl substituent. In contrast, it has been found that the corresponding symmetrical derivative (N,N'-bis-(phenylethyl)-p-phenylenediamine) does not possess effective antiozonant properties.

The lack of predictability of antiozonant activity is further complicated when mixtures are used to obtain a synergistic effect and, therefore, to further improve the stabilization activity of the additives.

DESCRIPTION OF THE INVENTION

It now has been found that a mixture of the phenylenediamine antiozonant and N,N'-bis-(phenylalkyl)-p-phenylenediamine product a synergistic mixture which affords greater stability to the rubber. This improved stability is obtained even though the N,N'-bis-(phenylalkyl)-p-phenylenediamine by itself possess substantially no antiozonant activity. In addition, the synergistic mixture also serves to retard deterioration of the rubber due to oxidation.

In one embodiment the present invention relates to a mixture of phenylenediamine antiozonant and N,N'-bis-(phenylalkyl)-p-phenylenediamine.

In another embodiment the present invention relates to the use of the above mixture as an additive to rubber.

As hereinbefore set forth, one component of the mixture of the present invention comprises a phenylenediamine antiozonant. In one embodiment the phenylenediamine antiozonant is an N,N'-di-sec-alkyl-p-phenylenediamine in which each alkyl contains from 3 to about 20 carbon atoms and more particularly from 3 to 10 carbon atoms. Illustrative examples in this embodiment include:

N,N'-diisopropyl-p-phenylenediamine,
N,N'-sec-butyl-p-phenylenediamine,
N,N'-sec-pentyl-p-phenylenediamine,
N,N'-sec-hexyl-p-phenylenediamine,
N,N'-sec-heptyl-p-phenylenediamine,
N,N'-sec-octyl-p-phenylenediamine,
N,N'-sec-nonyl-p-phenylenediamine and
N,N'-sec-decyl-p-phenelenediamine In another embodiment the phenylenediamine antiozonant is an N-alkyl-N'-phenyl-p-phenylenediamine in which the alkyl contains from 3 to about 20 and more particularly from 3 to 10 carbon atoms. Illustrative examples include:

N-isopropyl-N'-phenyl-p-phenylenediamine,
N-sec-butyl-N'-phenyl-p-phenylenediamine,
N-sec-pentyl-N'-phenyl-p-phenylenediamine,
N-sec-hexyl-N'-phenyl-p-phenylenediamine,
N-sec-heptyl-N'-phenyl-p-phenylenediamine,
N-sec-octyl-N'-phenyl-p-phenylenediamine,
N-sec-nonyl-N'-phenyl-p-phenylenediamine and
N-sec-decyl-N'-phenyl-p-phenylenediamine Other phenylenediamine antiozonants include N,N'-dicycloalkyl-p-phenylenediamine and more particularly N,N'-dicyclohexyl-p-phenylenediamine. It is understood that mixtures of the phenylenediamine antiozonants may be used.

As hereinbefore set forth, the p-phenylenediamine antiozonant is used in admixture with an N,N'-bis-(phenylalkyl)-p-phenylenediamine. The alkyl moiety of the phenylalkyl group may contain from 1 to 20 and preferably from 1 to 6 carbon atoms.

A preferred compounds comprises N,N'-bis-(phenylethyl)-p-phenylenediamine and more particularly N,N'-bis-(1-phenylethyl)-p-phenylenediamine. Other compounds include:

N,N'-bis-(phenylmethyl)-p-phenylenediamine,
N,N'-bis-(phenylpropyl)-p-phenylenediamine,
N,N'-bis-(phenylbutyl)-p-phenylenediamine,
N,N'-bis-(phenylpentyl)-p-phenylenediamine,
N,N'-bis-(phenylhexyl)-p-phenylenediamine, etc.

It is understood that mixtures of the N,N'-bis-(phenylalkyl)-p-phenylenediamines may be used.

The p-phenylenediamine antiozonants are prepared in any suitable manner and the prior art is replete with examples of such preparations. The N,N'-bis-(phenylalkyl)-p-phenylenediamines are prepared in any suitable manner. In one method these are prepared by the reductive alkylation of p-phenylenediamine or p-nitroaniline with the desired phenone. For example, N,N'-bis-(1-phenylethyl)-p-phenylenediamine is prepared by reductive alkylation using acetophenone. Other phenones for use in the reductive alkylation include propiophenone, butyrophenone, valerophenone, caprylophenone and, when higher molecular weight compounds are desired, illustrative phenones for use in the reductive alkylation include laurylphenone, palmitylphenone, etc. The reductive alkylation is effected in any suitable manner and, generally under a hydrogen pressure of from about 100 to 3,000 p.s.i. or more and more particularly of from about 1000 to about 2000 p.s.i., temperature of from about 200° to about 500° F. and more particularly from about 250° to about 350° F., and with at least 2 moles of phenone per mole of phenylenediamine and preferably an excess of from about 3 to about 20 and more particularly from about 3 to about 8 moles of phenone per mole of phenylenediamine or p-nitroaniline. Any suitable reductive alkylation catalyst is used. One catalyst comprises an intimate mixture of copper oxide, chromium oxide and barium oxide. Other catalysts include those containing nickel, molybdenum, platinum and/or palladium. A particularly preferred catalyst comprises a composite of alumina with from about 0.1 to about 5% or more of platinum, which composite may or may not contain chlorine and/or fluorine in a total concentration of from about 0.2 to about 5% or more by weight of the composite.

In another method, the N,N'-bis-(phenylalkyl)-p-phenylenediamine is prepared by the reaction of p-phenylenediamine with styrene. For example, the reaction is effected in the presence of an alkali metal at a temperature of from about 250° to about 500° F. and more particularly from about 330° to about 430° F. The alkali metal includes sodium, potassium, lithium, etc. and may be used in a concentration of from about 0.01% to about 5% or more by weight, based upon the weight of the reactants.

In another embodiment, the synergistic compound for use in the present invention may be prepared by the reductive alkylation of p-phenylenediamine or p-nitroaniline with benzophenone. The synergistic compound produced in this manner will be N,N'-bis-(diphenylmethyl)-p-phenylenediamine. The synergistic compound, including both of the above embodiments, may be illustrated by the following formula:

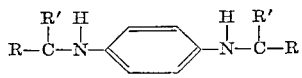

where R is phenyl and R' is alkyl or phenyl. When R' is alkyl, it may contain from 1 to about 20 and preferably from 2 to 10 carbon atoms.

It is understood that one or both of the phenyl groups may contain one or more hydrocarbon and particularly alkyl substituents attached to the nucleus. For example, N,N'-bis-(methylphenylethyl)-p-phenylenediamine is prepared by the reaction of vinyl toluene with p-phenylenediamine.

As hereinbefore set forth, the components are used in a synergistic proportion. In one embodiment this may comprise from about 5% to about 95% of one component and from about 95% to about 5% of the other component. In most cases it is preferred to utilize these components in concentrations of from about 25% to about 75% of one component and from about 75% to about 25% of the other component. In a particularly preferred embodiment, the p-phenylenediamine antiozonant comprises from about 50% to about 90% and the N,N'-bis-(phenylalkyl)-p-phenylenediamine comprises from about 50% to about 10% by weight of the synergistic mixture.

The synergistic mixture of the present invention is used in rubber in a concentration sufficient to effect the desired stabilization. The concentration may range from about 1.5% to about 6% and more particularly from 2% to 4% by weight of the rubber although, in some cases, higher or lower concentrations may be employed. These concentrations are based on the rubber hydrocarbon exclusive of the other components of the rubber composition and are used in this manner in the present specifications and claims. When desired, the synergistic mixture may be used along with an additional antioxidant and also is used along with other additives incorporated in rubber for specific purposes including accelerators, softeners, extenders, wax, reinforcing agents, etc.

When used along with an additional antioxidant, it is understood that any suitable antioxidant may be employed including, for example, 2,6-di-tert-butyl-4-methylphenol, phenyl-beta-naphthylamine, 6-phenyl-2,2,4-trimethyl-1,2-dihydroquinoline, marketed under the trade name of "Santoflex-B," 2,2'-methylene-bis-(4-methyl-6-tert-butylphenol), 2,6-di-tert-butyl-p-cresol, the reaction product of acetone and diphenylamine, marketed under the trade name of "B.L.E.," etc. These antioxidants generally are used in a concentration of from about 0.5% to about 3% by weight of the rubber.

When desired, the synergistic mixture of the present invention also is used along with paraffin and/or microcrystalline wax. The wax generally is utilized in a concentration of from 0.5% to 3% by weight of the rubber.

In one embodiment the components of the synergistic mixture are added separately to the rubber formula. In another and preferred embodiment the components of the synergistic mixture are combined and then added to the rubber formula. In still another embodiment the synergistic mixture is admixed with the additional antioxidant, wax and/or other additives, and the mixture then is composited with one or more of the other components of the rubber formulation. In a preferred embodiment the synergistic mixture is incorporated in the latex prior to milling. In still another embodiment vulcanized rubber may be soaked, dipped or suspended in the synergistic mixture to apply a surface coating to the rubber, or the synergistic mixture may be sprayed, poured or otherwise contacted with the previously vulcanized rubber.

The synergistic mixture of the present invention is utilized in any rubber formulation subject to ozone cracking, including those used for automobile and truck tires and tubes, hose, belting, sheet and thread rubber, rubberized fabrics, molded goods, boots and shoes, etc. whether vulcanized in a mold, in open steam, in hot air, or in the cold by the so-called acid process. In another embodiment, the present invention can be utilized for the stabilization of adhesives, elastomers, etc., which tend to crack due to ozone.

When the synergistic mixture is added to a liquid such as rubber pigment or an oil, it is dissolved therein in the desired proportions. When the synergistic mixture is added to a solid substrate, it is incorporated therein by milling, mastication, etc. The synergistic mixture may be utilized as such or as a solution or dispersion or as a powder, paste, etc.

In general, rubber is classified as a vulcanizable diene hydrocarbon rubber and comprises polymers of conjugated 1,3-dienes, either as polymers thereof or as copolymers thereof with other polymerizable compounds. In one embodiment the rubber is a synthetic rubber including, for example, butadiene-styrene copolymer rubber presently referred to in the art as SBR rubber, Buna-N rubber (NBR) produced from butadiene and acrylonitrile, butyl rubber produced from butadiene and isobutylene, neoprene, etc. The natural rubbers include Hevea rubber, caoutchouc, balata, gutta-percha, etc. It is understood that the term rubber as used in the present specifications and claims is intended to include both synthetic rubber and natural rubber which undergo cracking due to ozone.

The following examples are introduced to illustrate further the novelty and utility of the present invention but not with the intention of unduly limiting the same.

EXAMPLE I

This example describes the preparation of N,N'-bis-(1-phenylethyl)-p-phenylenediamine which was used as the synergistic compound in the following example. This compound was prepared by the reductive alkylation of p-phenylenediamine with acetophenone. Specifically, 110 g. (1 mole) of p-phenylenediamine, 480 g. (4 moles) of acetophenone were reacted in the presence of 100 g. of alumina-platinum catalyst at a temperature of about 320° F. and a hydrogen pressure of about 1500 lbs./p.s.i.

The reaction was effected in a rotating autoclave for about 6 hours. After completion of the reaction, the reaction mixture was washed with warm acetone, filtered to remove catalyst, chilled and recrystallized from hot acetone to recover about 60 g. of the product as crystals having a melting point of 336–340° F. and a basic nitrogen equivalent weight of 159 g.

EXAMPLE II

The base rubber used in this example had the following recipe:

TABLE I

| Ingredient: | Parts by wt. |
| --- | --- |
| SBR-1502 | 100 |
| Furnace black | 40 |
| Zinc oxide | 3 |
| Stearic acid | 2 |
| Sulfur | 2 |
| Accelerator [1] | 1 |

[1] N-cyclohexyl-2-benzothiazole-sulfeneamide.

A sample of the rubber of the above recipe was used as the blank or control sample. Different additives were incorporated in other samples of the rubber during milling as will be specifically set forth below. All of the samples were formed into strips 6 inches long, 0.75 inch wide and 0.08 inch thick and cured individually at 284° F. The samples then were preaged at 194° F. for 0, 1 and 2 days, after which different samples were elongated 10% or 20% and evaluated in an ozone cabinet at 100° F. in an atmosphere containing 50 parts of ozone per 100 million parts of air. The samples were examined periodically and the time to first visible cracks was determined and is reported below.

All control samples underwent visible cracks within 2 hours of exposure in the ozone cabinet.

Samples of the rubber containing 2% by weight of a phenylenediamine antiozonant (N,N'-di-2-octyl-p-phenylene-diamine) and elongated 10% did not undergo cracking for more than 268 hours in the ozone cabinet for the sample preaged for 1 day. However, the sample elongated 10% and preaged for 2 days underwent cracking within 24 hours. The samples elongated 20% and preaged for 1 or 2 days underwent cracking within 8 hours. The phenylenediamine antiozonant is very effective when used in this rubber formulation at concentrations of 4% or more by weight. For example, samples of the rubber containing 4% by weight of the N,N'-di-2-octyl-p-phenylenediamine, elongated 10% and preaged for 0, 1 or 2 days did not undergo cracking for greater than 168 hours of exposure in the ozone cabinet and this is also true for the samples elongated 20% and preaged for 0 or 1 day. However, the sample elongated 20% and preaged for 2 days underwent cracking within 4 hours of exposure in the ozone cabinet.

EXAMPLE III

As hereinbefore set forth, N,N'-di-2-octyl-p-phenylene-diamine is an effective antiozonant but is even further improved by the synergistic mixture of the present invention. Another batch of samples of the same rubber base were prepared to contain 2% by weight of N,N'-bis-(1-phenylethyl)-p-phenylenediamine and still another batch was prepared to contain 2% by weight each of N,N'-di-2-octyl-p-phenylenediamine and N,N'-bis-(1-phenylethyl)-p-phenylene-diamine. The N,N'-bis-(1-phenylethyl)-p-phenylenediamine was prepared as described in Example I. The different samples of rubber were preaged at 194° F., elongated 10% or 20% and evaluated in the same manner as described in Example II.

The samples fo rubber containing 2% by weight of N,N'-bis-(1-phenylethyl) - p - phenylenediamine and elongated 10% underwent cracking within 48 hours for all samples. The samples elongated 20% all underwent cracking within 24 hours of exposure in the ozone cabinet. These data demonstrate that N,N'-bis-(1-phenylethyl)-p- phenylenediamine by itself possesses substantially no potency as an antiozonant.

EXAMPLE IV

As demonstrated in Example III, N,N'-bis-(1-phenylethyl)-p-phenylenediamine does not possess antiozonant properties. Accordingly, it is surprising that this compound does act as a synergist to improve the potency of N,N'-di-2-octyl-p-phenylenediamine. This is demonstrated by results obtained when different samples of the rubber containing 2% by weight of N,N'-di-2-octyl-p-phenylene-diamine and N,N'-bis-(1-phenylethyl) - p - phenylenediamine were prepared, preaged and evaluated in the ozone cabinet in the same manner as described in the preceding examples. All of the samples elongated 10% and also those elongated 20% were crack-free after 168 hours of exposure in the ozone cabinet. Thus, the mixture containing 4% of total additives was more effective than the mixture containing 4% of N,N'-di-2-octyl-p-phenylene-diamine in the sample elongated 20% and preaged for 2 days. As hereinbefore set forth, this is surprising, because it would not be expected that a compound of substantially no potency as an antiozonant would be an effective component of a synergistic mixture.

EXAMPLE V

The synergistic mixture of this example comprises 60% by weight of N-phenyl-N'-(1,3-dimethylbutyl)-p-phenylene-diamine antiozonant and 40% by weight of N,N'-bis-(methyl-phenylethyl)-p-phenylenediamine. This synergistic mixture is incorporated in a concentration of 4% by weight in other sample of the synthetic rubber of the base recipe described in Example II. The synergistic mixture is incorporated during milling of the rubber and serves to improve the stability of the rubber against cracking due to ozone.

EXAMPLE VI

The synergistic mixture of this example comprises 70% by weight of N,N'-dicyclohexyl-p-phenylenediamine and 30% by weight of N,N'-bis-(phenylmethyl)-p-phenylene-diamine. The synergistic mixture is incorporated in a concentration of 3.5% by weight in natural rubber.

EXAMPLE VII

The synergistic mixture of this example comprises 75% by weight of N-phenyl-N'-isopropyl-p-phenylenediamine and 25% by weight of N,N'-bis-(diphenylmethyl)-p-phenylene-diamine. As hereinbefore set forth, the last named compound is prepared by the reductive alkylation of p-phenylenediamine with benzophenone. The synergistic mixture is incorporated in a concentration of 3% by weight in neoprene rubber.

I claim as my invention:
1. A mixture of from about 5% to about 95% by weight of phenylene diamine antiozonant and from about 95% to about 5% by weight of N,N'-bis-(phenylalkyl)-p-phenylenediamine in which the alkyl moiety of such phenylalkyl group contains from 1 to about 6 carbon atoms, said phenylenediamine antiozonant being selected from the group consisting of:
   (a) N,N'-di-sec - alkyl - p - phenylenediamine in which each alkyl contains from 3 to about 10 carbon atoms;
   (b) N-alkyl-N'-phenyl - p - phenylenediamine in which the alkyl contains from 3 to about 10 carbon atoms; and
   (c) N,N'-dicyclohexyl-p-phenylenediamine.
2. The mixture of claim 1 comprising from about 50% to about 90% by weight of the phenylenediamine antiozonant and from about 50% to about 10% by weight of the N,N'-bis-(phenylalkyl)-p-phenylenediamine.
3. The mixture of claim 2 wherein said phenylene-diamine antiozonant is N,N'-di-sec-alkyl-p-phenylenedi-amine in which each alkyl contains from 3 to about 10 carbon atoms.

4. The mixture of claim 3 wherein said phenylenediamine antiozonant is N,N'-di-sec-octyl-p-phenylenediamine.

5. The mixture of claim 1 wherein said phenylenediamine antiozonant is N-phenyl-N'-sec-alkyl-p-phenylenediamine in which said alkyl contains from 3 to about 10 carbon atoms.

6. The mixture of claim 5 wherein said phenylenediamine antiozonant is N-phenyl-N'-sec-hexyl-p-phenylenediamine.

7. The mixture of claim 1 wherein said phenylenediamine antiozonant is N,N'-dicyclohexyl-p-phenylenediamine.

8. The mixture of claim 1 wherein said N,N'-bis-(phenylethyl)-p-phenylenediamine.

9. Rubber normally subject to cracking due to ozone selected from the group consisting of natural rubber and synthetic vulcanizable diene rubber containing a small but stabilizing concentration of the mixture of claim 1.

10. The composition of claim 9 wherein said rubber is styrene-butadiene rubber.

References Cited

UNITED STATES PATENTS

| Re. 25,260 | 10/1962 | Wilson | 260—54.9 |
| 3,163,616 | 12/1964 | Stahly | 260—45.9 |
| 3,247,161 | 4/1966 | Cox | 260—45.9 |

HOSEA E. TAYLOR, JR., Primary Examiner

U.S. Cl. X.R.

252—401; 260—23.7, 41.5, 807, 809, 814, 815